United States Patent [19]

Koishi et al.

[11] Patent Number: 4,631,326

[45] Date of Patent: Dec. 23, 1986

[54] CURABLE FLUORINE-CONTAINING COPOLYMER AND COATING LIQUID COMPOSITION USING SAME

[75] Inventors: Toshio Koishi, Sakado; Takashi Yasumura, Fujimi, both of Japan

[73] Assignee: Central Glass Company Limited, Ube, Japan

[21] Appl. No.: 768,244

[22] Filed: Aug. 22, 1985

[30] Foreign Application Priority Data

Aug. 30, 1984 [JP] Japan ................................ 59-179174

[51] Int. Cl.$^4$ ............................................ C08F 214/18
[52] U.S. Cl. .................................................... 526/249
[58] Field of Search ........................ 526/249, 332, 333

[56] References Cited

U.S. PATENT DOCUMENTS

| | | | |
|---|---|---|---|
| 2,599,640 | 6/1952 | Joyce | 526/249 |
| 2,600,683 | 6/1952 | Pearson | 526/249 |
| 2,600,684 | 6/1952 | Pearson | 526/249 |
| 2,834,767 | 5/1958 | Hoyt | 526/249 |
| 2,905,660 | 9/1959 | Robertson | 526/249 |
| 3,025,269 | 3/1962 | Calfee | 526/333 |

FOREIGN PATENT DOCUMENTS

888014 1/1962 United Kingdom .
2081727 2/1982 United Kingdom .

OTHER PUBLICATIONS

Thomas and O'Shaughnessy, "Kinetics of Chlorotrifluoroethylene Polymerization", Journal of Polymer Science, vol. 11, No. 5, pp. 455-470, (1950).

*Primary Examiner*—Harry Wong, Jr.
*Attorney, Agent, or Firm*—Fleit, Jacobson, Cohn & Price

[57] ABSTRACT

Disclosed is a curable fluorine-containing copolymer, comprising 25-75 mol % of first repeating units which originate from chlorotrifluoroethylene, 10-70 mol % of second repeating units which originate from a vinyl or isopropenyl ester of fatty acid, such as vinyl acetate or isopropenyl acetate, 3-40 mol % of third repeating units which originate from a hydroxyl-containing allyl ether such as ethylene glycol monoallyl ether and 0-20 mol % of optional repeating units which originate from an optional monomer such as an acrylate. This copolymer possesses favorable properties characteristic of fluororesins, is soluble in organic liquids and is curable with a compound having a functional group that reacts with active hydrogen, such as a polyisocyanate. A coating liquid composition obtained by adding such a curing agent to a solution of the copolymer in an organic solvent is of wide use for painting and other coating purposes.

12 Claims, 2 Drawing Figures

CURABLE FLUORINE-CONTAINING COPOLYMER AND COATING LIQUID COMPOSITION USING SAME

BACKGROUND OF THE INVENTION

This invention relates to a novel curable copolymer of chlorotrifluoroethylene, a fatty acid ester and a hydroxyl-containing allyl ether and also to a coating liquid composition using the novel copolymer.

Polymers of some fluoro compounds have provided synthetic resins which have good mechanical properties and are superior in heat resistance, chemical resistance and weather resistance. As one field of wide applications of fluorine-containing polymers or fluoro-resins, progressive development has been made in the use of fluoro-resins as paint vehicles with a view to utilizing their excellent chemical resistance and weather resistance for producing maintenance-free coatings. For example, polytetrafluoroethylene, polychlorotrifluoroethylene and copolymers of vinylidene fluoride have attracted interest for this purpose, and also it has been developed to modify a conventional synthetic resin base paint by the addition of a certain fluoro-resin.

In the early days of the development fluoro-resin base paints were almost limited to powder paints and dispersions in water or organic liquid, and these paints require high temperature baking finish which calls for skill and should be performed by experts. To expand practical applicabilities of fluoro-resin base paints, recently much attention has been directed to fluoro-resin base paints of the solvent-thinned type which do not require baking finish and, therefore, can easily be used on the site of mechanical manufacturing or building work.

To obtain fluoro-resins that are soluble in practicable organic solvents and useful as vehicles in solvent-thinned paints, usually it is necessary to reduce crystallinity of fluorine-containing polymers by certain means such as copolymerization to thereby accomplish internal plasticization. Furthermore, there are some problems to be settled in producing a practical paint by using a fluoro-resin which is rendered soluble. For instance, the problems will be how to retain a desirable degree of rigidity or shear modulus in the soluble fluoro-resin, how to control the molecular weight of the fluoro-resin with a view to desirably adjusting the viscosity of the paint and how to select and control the kind and amount of functional groups which must be introduced into the soluble fluoro-resin in order to obtain a paint that is curable and accordingly is recoatable. Cost of production also has to be taken into consideration. It is not always easy to reach balanced solutions for all of these problems.

It is reported in British patent No. 888,014 and in J. Polymer Science, 11, No. 5, 455 (1953) that a copolymer of chlorotrifluoroethylene with a vinyl ester of fatty acid exhibits high transparency over a wide range of wavelength and possesses high tensile strength and excellent impact resistance and can relatively easily be dissolved in organic solvents by moderate heating. If a solution of this copolymer is used as a paint or coating composition it is possible to obtain a coating film that is hard, transparent and glossy. However, this solution lacks recoatability since the copolymer is not curable.

SUMMARY OF THE INVENTION

It is an object of the present invention to provide a novel curable fluorine-containing copolymer by copolymerizing chlorotrifluoroethylene and a fatty acid ester together with another monomer which provides functional groups to the copolymer.

It is another object of the invention to provide a coating liquid composition which comprises a solution of a curable fluorine-containing copolymer according to the invention and, therefore, is convenient for practical use and has recoatability.

We have accomplished these objects fundamentally by discovering that a hydroxyl-containing allyl ether can easily be copolymerized with chlorotrifluoroethylene and a fatty acid ester to form a ternary copolymer which has functional groups and, hence, can be cured by using a suitable curing agent. Our discovery is believed to be unexpected since hydroxyl-containing allyl ethers have been accepted as not liable to undergo radical copolymerization with monomers used for popular polymers.

More specifically, this invention provides a curable copolymer comprising 25 to 75 mol % of first repeating units which originate from chlorotrifluoroethylene, 10 to 70 mol % of second repeating units which originate from a fatty acid ester represented by the general formula (I),

wherein R represents hydrogen atom or methyl group and R' represents an alkyl group having 1 to 12 carbon atoms, and 3 to 40 mol % of third repeating units which originate from a hydroxyl-containing allyl ether represented by the general formula (II),

wherein n is an integer from 1 to 6.

Optionally, the copolymer according to the invention may further comprise not more than 20 mol % of optional repeating units which originate from a monomer or monomers different from the above defined essential monomers.

The amounts of the essential three components of the copolymer are limited within the above specified ranges, respectively, in view of the following tendencies.

If the amount of chlorotrifluoroethylene is too large the copolymer becomes low in solubilities in organic solvents and, besides, it becomes difficult to prepare the copolymer with high yield. If the amount of this component is too small the copolymer becomes insufficient in chemical resistance and weather resistance. It is preferred that the repeating units originating from chlorotrifluoroethylene amounts to 40–60 mol %. The second monomer represented by the general formula (I) is a vinyl or isopropenyl ester of fatty acid. If the amount of this fatty acid ester is too large the copolymer becomes insufficient in chemical resistance and weather resistance. If the amount of this component is too small the copolymer will become low in molecular weight, and some difficulty will arise in preparing the copolymer. It is preferred that the repeating units originating from a vinyl or isopropenyl ester of fatty acid amounts to 20–50 mol %. If the amount of a hydroxyl-containing allyl ether is too large the copolymer will become low in molecular weight, and some difficulty will arise in preparing the copolymer. If the amount of this component is too small the copolymer becomes low in the tendency toward curing reaction and, therefore, becomes insufficient in chemical resistance, weather resistance and some physical, properties, and a coating liquid composition using the copolymer becomes poor in recoatability. It is preferred that the allyl ether component amounts to 5–30 mol %. If the amount of the optional component exceeds 20 mol % the copolymer will become insufficient in solubilities, transparency, etc., and some difficulty will arise in preparing the copolymer. It is preferred that the amount of the optional component is not more than 10 mol %.

Where it is intended to use a copolymer according to the invention for a coating liquid composition, it is important to adjust the composition of the copolymer such that the intrinsic viscosity of solution of the copolymer in tetrahydrofuran at 30° C. falls in the range from 0.01 to 2.0 dl/g, and preferably in the range from 0.05 to 0.5 dl/g. When the intrinsic viscosity is too high the solubilities of the copolymer in organic solvents are not desirably high. When the intrinsic viscosity is too low the coating liquid composition will be unsatisfactory in workability and will fail to provide coating films having desirably good properties.

A copolymer according to the invention is excellent in chemical resistance and weather resistance since it has C—F bonds in the molecular chain and exhibits good adhesion to steels, aluminum and other metals since it has ester bonds. Furthermore, this copolymer has active hydrogen and accordingly can be cured by reaction with a compound having a functional group that reacts with active hydrogen.

A copolymer according to the invention is soluble in various kinds of organic solvents. As an important use of the novel copolymer, this invention provides a coating liquid composition which comprises a solution of a copolymer according to the invention in an organic solvent and a curing agent for the copolymer added to the solution.

A coating liquid composition according to the invention provides a coating film which is hard, transparent and glossy and possesses the characteristic properties of the novel copolymer. When a polyisocyanate is used as the curing agent in the coating liquid composition curing of the coating film can be accomplished at room temperature, so that the coating composition is useful for coating various materials including wood and concrete. By using a different type of curing agent, such as melamine for example, the coating liquid composition can be rendered a baking finish coating or paint which is suited to application to metal materials.

DESCRIPTION OF THE PREFERRED EMBODIMENTS

Figure 1:
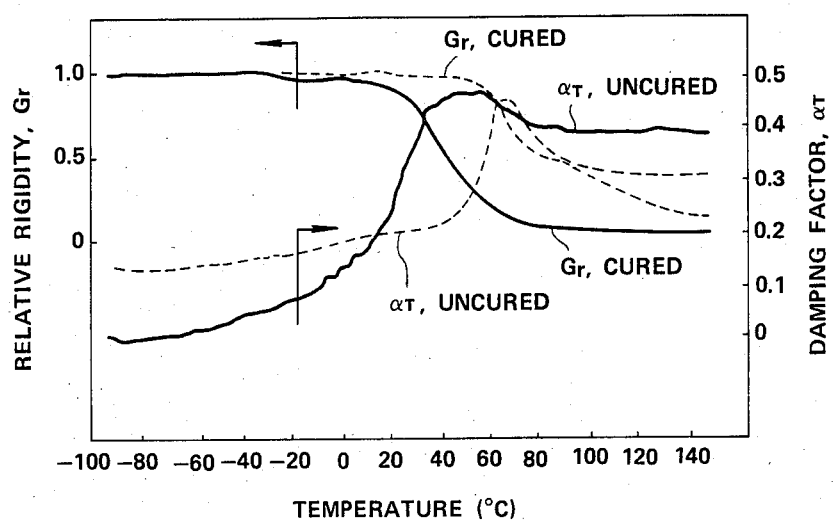
FIG. 1 is a graph showing the manner of changes in shear modulus characteristics of an example of copolymers according to the invention with temperature.

For fluorine-containing copolymers according to the invention chlorotrifluoroethylene is always used as the fluorine-containing component. As the second component which must have ester bond, vinyl esters and isopropenyl esters of fatty acids are alternatively useful. Examples of fatty acid vinyl esters suited to this invention are vinyl acetate, vinyl propionate, vinyl lactate, vinyl butyrate, vinyl isobutyrate, vinyl caproate, vinyl isocaproate, vinyl pivalate and vinyl caprylate. Examples of fatty acid isopropenyl esters suited to this invention are isopropenyl acetate and isopropenyl propionate. When using a fatty acid vinyl ester it is preferred to choose one in which the alkyl group, R' in the general formula (I), has 1 to 3 carbon atom(s). When using a fatty acid isopropenyl ester it is preferable to choose isopropenyl acetate because of ease of preparing a desired copolymer.

The third component which provides functional groups to the fluorine-containing copolymer is a hydoxyl-containing allyl ether represented by the general formula (II). Examples of useful hydroxyl-containing allyl ethers are ethylene gylcol monoallyl ether, diethylene glycol monoallyl ether and triethylene glycol monoallyl ether. It is very suitable to choose one in which the integer n in the general formula (II) is 1 or 2, and from a practical point of view it is preferable to use ethylene glycol monoallyl ether.

Besides the above described essential components, another monomer or some other monomers may optionally be incorporated into a copolymer according to the invention on condition that the optional comonomer(s) does not occupy more than 20 mol % of the copolymer. For example, an optional comonomer may be chosen from acrylates and methacrylates such as hydroxyethyl acrylate, hydroxyethyl methacrylate, methyl methacrylate and glycidyl methacrylate, acrylic amides such as acrylamide and N-methylol acrylamide and vinyl ethers such as ethyl vinyl ether and butyl vinyl ether.

As to the purities of monomers for use in this invention, gas chromatography purity of 98% or above is sufficient so long as impurities obstructive to usual radical polymerization reactions are not contained.

A copolymer according to the invention is obtained by copolymerizing the essential three kinds of monomers, and the optional monomer(s) if used, together in the presence of a commonly used radical polymerization initiator. The manner of the copolymerization reaction is not particularly limited. For example, the object is accomplished by solution polymerization, emulsion polymerization, suspension polymerization or bulk polymerization.

The copolymerization reaction can be carried out at temperatures ranging from about −30° C. to about 100° C. Usually a suitable range of the copolymerization reaction temperature is from about 0° C. to about 70° C. A suitable radical polymerization initiator can be selected from oil-soluble radical polymerization initiators including organic peroxides such as diisopropyl peroxydicarbonate, di-n-propyl peroxydicarbonate, t-butyl peroxypivalate, di-2-ethylhexyl peroxydicarbonate, benzoyl peroxide, lauroyl peroxide, propionyl peroxide, trichloroacetyl peroxide, perfluorobutyryl peroxide and perfluorooctanoyl peroxide, azo compounds such as azobisisobutyronitrile and azobis-2,4-dimethylvaleronitrile and certain organic boron compounds such as oxytriethylboron and peroxytriethylboron, and water-soluble radical polymerization initiators such as hydrogen peroxide, potassium persulfate, ammonium persulfate and redox-type initiators.

As to a liquid medium for the copolymerization reaction, a suitable selection is made from water, hydrocarbons and organic fluorine-containing compounds depending on the particulars of the reaction. If desired a mixture of two or three kinds of solvents may be used. In the cases of copolymerization reactions in an aqueous medium it is usual to use a conventional emulsifying or suspension stabilizing agent.

To prepare a coating liquid composition comprising a fluorine-containing copolymer according to the invention, a variety of organic solvents are of use. Examples are cyclic ethers such as tetrahydrofuran and dioxane, aromatic hydrocarbons represented by benzene and toluene, esters such as ethyl acetate and butyl acetate, ketones such as acetone, methyl ethyl ketone, methyl isobutyl ketone and cyclohexanone, some nitrogen-containing solvents such as dimethylformamide, dimethylacetamide and pyridine and some halogen-containing solvents such as 1,1,1-trichloroethane and trichloroethylene. Dissolution of a copolymer according to the invention in any of these solvents gives a colorless and transparent solution.

When a polyisocyanate is added to a solution of the fluorine-containing copolymer and the solvent is dissipated after applying the solution to a desired surface, curing reaction of the copolymer with the polyisocyanate takes place and proceeds at room temperature. When a blocked polyisocyanate is used the curing reaction is accomplished by heat treatment at a temperature above the dissociation temperature of the polyisocyanate. In either case a thoroughly cured coating film or paint film is obtained. It is also possible to use a different kind of compound having a functional group that reacts with active hydrogen as the curing agent. For example, melamine, urea resin or a polybasic acid or its anhydride may be used though heating is needed for accomplishment of the curing reaction. Besides a curing agent, desired additives such as pigment, ultraviolet-absorbing agent and/or dispersion stabilizing agent can be added to a solution of the fluorine-containing copolymer. Almost every additive used in conventional solvent-thinned paint compositions exhibits good dispersibility in a solution of the fluorine-containing copolymer.

The invention will further be illustrated by the following nonlimitative examples.

EXAMPLE 1

Initially 38.7 g of vinyl acetate (abbreviated to VAc), 30.6 g of ethylene glycol monoallyl ether (EGMAE), 645 ml of water, 75 ml of t-butyl alcohol, 0.15 g of methyl cellulose, 3.0 g of sodium borate and 0.75 g of diisopropyl peroxydicarbonate (IPP) were charged in a 1.4-liter stainless steel autoclave provided with electromagnetic stirrer, and the procedure of replacing the gas atmosphere in the autoclave by nitrogen gas was repeated three times. Then the autoclave was submerged in a methanol-dry ice bath for cooling, and the gas was purged from the autoclave. After that 87.5 g of chlorotrifluoroethylene (CTFE) was introduced into the autoclave, so that the CTFE/VAc/EGMAE proportions were 50/30/20 by mol. The temperature in the autoclave was gradually raised, and radical copolymerization reaction was carried out at 40° C. for 24 hr. After discharging an unreacted portion of CTFE from the autoclave, the reaction system in the form of slurry was filtered to obtain a copolymer in the form of fine particles, which were washed with water and dried. The dry weight of the copolymer powder was 91 g.

With respect to solution of this copolymer in tetrahydrofuran (THF) at 30° C., the intrinsic viscosity was measured to be 0.33 dl/g. By infrared absorption spectrum analysis of this copolymer, absorption peaks were observed at 3530 cm$^{-1}$ (—OH), 2870–2990 cm$^{-1}$ (C—H) and 1760 cm$^{-1}$ (C=O). Thermal analysis of this copolymer by differential scanning calorimetry (DSC) and thermogravimetry (TG) revealed that the copolymer does not have a melting point. By TG it was found that weight loss of the copolymer begins at a temperature above 250° C.

A solution was prepared by dissolving 40 g of the CTFE/VAc/EGMAE copolymer in a mixture of 30 g of toluene and 90 g of methyl isobutyl ketone. To this solution, 40 g of another solution prepared by dissolving 20 g of hexamethylene diisocyanate and 1.5 mg of dibutyl tin dilaurate in a mixture of 40 g of toluene and 40 g of methyl isobutyl ketone was added. The resultant solution was spread on a chromated and degreased aluminum plate and a galvanized and degreased steel plate and was left curing at room temperature. The coating films formed by this process were individually subjected to usual evaluation tests for paint films. The test items and the results are shown in Table 1.

TABLE 1

| Test Items | Substrate | Evaluation |
|---|---|---|
| Specular Gloss (incident angle: 60°) | Aluminum Plate | 115% |
| Pencil Hardness | " | 7H |
| Cross-cut Adhesion Test | " | 10 marks |
| Erichsen Test | " | 7 mm passed |
| duPont Shock Test (ball diameter 0.5", weight 500 g) | Galvanized Steel Plate | 50 cm |
| Flexibility | Galvanized Steel Plate | 2T |

EXAMPLE 2

Initially 43.0 g of VAc, 5.1 g of EGMAE, 500 ml of t-butyl alcohol and 1.5 g of benzoyl peroxide (BPO) were charged in the 1.4-liter autoclave used in Example 1, and the gas atmosphere in the autoclave was replaced by nitrogen gas. Then the autoclave was cooled for solidifying the reactants, and the gas was purged from the autoclave. After that 60 g of CTFE was introduced into the autoclave, so that the CTFE/VAc/EGMAE proportions became 48/47/5 by mol. The temperature in the autoclave was gradually raised, and radical copolymerization reaction was carried out at 65° C. for 24 hr. After purging an unreacted portion of CTFE from the autoclave, the reaction system was entirely poured into a large volume of water to precipitate a powdery copolymer, which was separated by filtration and was washed with water. The dry weight of the obtained copolymer was 74 g.

With respect to solution of this CTFE/VAc/EGMAE copolymer in THF at 30° C., the intrinsic viscosity was measured to be 0.24 dl/g. By elementary analysis, this copolymer contained 4.49% of H, 40.70% of C and 13.70% of Cl. By infrared absorption spectrum analysis of this copolymer, absorption peaks were observed at 3530 cm$^{-1}$ (—OH), 2860–3000 cm$^{-1}$ (C—H) and 1760 cm$^{-1}$ (C=O).

A solution was prepared by dissolving 3 g of this CTFE/VAc/EGMAE copolymer in 12 g of ethyl acetate. To this solution, 3.0 g of another solution prepared by dissolving 0.5 g of hexamethylene diisocyanate in 9.5 g of ethyl acetate was added. The resultant solution was applied to a degreased glass plate and was left curing at room temperature. A number of coating film samples were produced by the same process and were subjected to chemical resistance tests at room temperature. For comparison, coating film samples formed of a CTFE/VAc binary copolymer were tested under the same conditions. The chemicals used in testing and the test results are shown in Table 2. In Table 2: "A" means no change in the appearance of the tested coating film; "B" means some change in the appearance; and "C" means dissolution of the tested coating film.

TABLE 2

|  | CTFE/VAc/EGMAE Copolymer of Example 2 | CTFE/VAc Copolymer for Comparison | |
|---|---|---|---|
|  | immersion 30 days | immersion 1 day | immersion 30 days |
| 10% sodium hydroxide solution | A | A | A |
| 10% sulfuric acid solution | A | A | A |
| 0.3% sulfurous acid solution | A | B | B |
| toluene | A | C | C |
| chloroform | A | C | C |

EXAMPLE 3

A CTFE/VAc/EGMAE copolymer was prepared by the same process and under the same conditions as in Example 1 except that the quantities of the monomers were varied. In this case 32.3 g of VAc, 38.3 g of EGMAE and 88.2 g of CTFE were used, so that the CTFE/VAc/EGMAE proportions became 50/25/25 by mol. The dry weight of the obtained copolymer was 76 g.

With respect to solution of this copolymer in THF at 30° C., the intrinsic viscosity was 0.31 dl/g. By elementary analysis this copolymer contained 3.95% of H, 37.83% of C and 14.65% of Cl.

A mixed solution (Solution A) of this CTFE/VAc/EGMAE copolymer, hexamethylene diisocyanate and dibutyl tin dilaurate was prepared in the same manner as in Example 1. Another solution (Solution B) was prepared by dissolving the same copolymer in the same solvent without adding the curing agent. A sample of a glass fiber was impregnated with Solution A and was left at room temperature to allow evaporation of the solvent and curing of the copolymer. Another sample of the same glass fiber was impregnated with Solution B and dried at room temperature. On these two kinds of samples, relative rigidity and damping factor were measured by a torsional pendulum free damping method (JIS K 7213 B method). The results were as shown in FIG. 1, wherein the curves in solid line represent the sample impregnated with the uncured copolymer (using Solution B) and the curves in broken line represent the sample impregnated with the cured copolymer (using Solution A). The curves in FIG. 1 clearly indicate the effects of curing of the impregnated copolymer.

A paint composition was prepared by first dissolving 20 g of the CTFE/VAc/EGMAE copolymer of Example 3 in a mixture of 15 g of toluene and 15 g of methyl isobutyl ketone, then adding 10 g of a fine powder of titanium oxide to the solution and kneading the resultant mixture in a ball mill for 1 hr. The titanium oxide powder was well dispersed in the copolymer solution, and application of this composition to various surfaces gave excellent paint films.

EXAMPLE 4

Initially 43.6 g of VAc, 5.1 g of EGMAE, 700 ml of water, 0.1 g of ammonium perfluorooctanoate, 0.35 g of sodium borate, 0.78 g of sodium dihydrogenphosphate and 1.0 g of potassium persulfate were charged in the 1.4-liter autoclave used in Example 1. After the same preliminary procedure as in the preceding examples, 58.6 g of CTFE was introduced into the cooled autoclave, so that the CTFE/VAc/EGMAE proportions became 47/48/5 by mol. The temperature in the autoclave was gradually raised, and radical copolymerization reaction was carried out at 55° C. for 24 hr. After purging an unreacted portion of of CTFE from the autoclave, the reaction system in the form of latex was subjected to salting-out with saturated solution of sodium chloride. Then the precipitate was recovered by filtration and washed with water. The product of this process was a copolymer in the form of powder, which weighed 73 g after drying.

With respect to solution of this copolymer in THF at 30° C., the intrinsic viscosity was 1.56 dl/g. By elementary analysis, this copolymer contained 5.00% of H, 40.91% of C and 13.23% of Cl.

Figure 2:
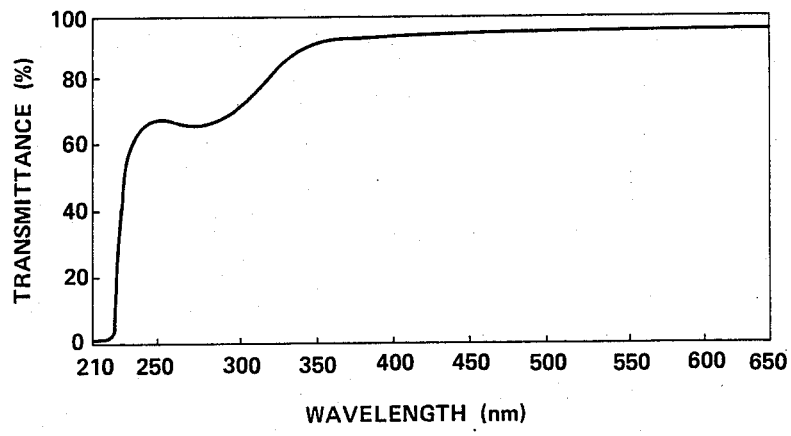
FIG. 2 is a graph showing light transmission characteristics of a coating film formed by using a copolymer according to the invention.

A solution of this CTFE/VAc/EGMAE copolymer and hexamethylene diisocyanate in a mixture of toluene and methyl isobutyl ketone was applied to a glass sheet to form a coating film. After curing at room temperature, transmissivities of this coating film to visible and ultraviolet rays were measured. As shown in FIG. 2, the coating film was high in light transmission over a wide range of wavelength.

EXAMPLE 5

Initially 10 g of isopropenyl acetate (IPAc), 2.0 g of EGMAE, 100 ml of 1,1,2-trichloro-1,2,2-trifluoroethane (F-113) and 0.3 g of BPO were charged in a 0.2-liter stainless steel autoclave provided with electromagnetic stirrer. After performing the same preliminary procedure as in the preceding examples, 11.6 g of CTFE was introduced into the cooled autoclave, so that the CTFE/IPAc/EGMAE proportions became 48/47/5 by mol. The temperature in the autoclave was gradually raised, and radical copolymerization reaction was carried out at 60° C. for 24 hr. The reaction product was a powdery copolymer, which was recovered by filtration and washed. After drying the copolymer weighed 4.7 g.

With respect to solution of this copolymer in THF at 30° C., the intrinsic viscosity was 0.35 dl/g. By infrared absorption spectrum analysis of this copolymer, absorption peaks were observed at 3520 cm$^{-1}$ (—OH), 1950–3010 cm$^{-1}$ (C—H) and 1740 cm$^{-1}$ (C=O).

This CTFE/VAc/EGMAE copolymer and hexamethylene diisocyanate were dissolved in ethyl acetate in the same manner as in Example 2, and the solution was applied to a glass plate. In 3 hr at room temperature the coating film became tack-free. After the lapse of 2 days the coating film was in a fully cured state and exhibited good resistance to chemicals.

EXAMPLE 6

Initially 28.4 g of VAc, 5.1 g of EGMAE, 500 ml of F-113 and 1.5 g of BPO were charged in the 1.4-liter autoclave used in Example 1. After performing the same preliminary procedure as in the preceding examples, 77.3 g of CTFE was introduced into the cooled autoclave, so that the CTFE/VAc/EGMAE proportions became 64/31/5 by mol. The temperature in the autoclave was gradually raised, and radical copolymerization reaction was carried out at 65° C. for 24 hr. After purging an unreacted portion of CTFE from the autoclave, a copolymer formed by the reaction was precipitated and treated in the same manner as in Example 2. The dry weight of the obtained copolymer was 25 g.

With respect to solution of this copolymer in THF at 30° C., the intrinsic viscosity was 0.13 dl/g. By elementary analysis, this copolymer contained 5.15% of H, 37.97% of C and 13.47% of Cl.

A solution was prepared by dissolving 3 g of this CTFE/VAc/EGMAE copolymer in 12 g of ethyl acetate and adding 0.15 g of hexamethylene diisocyanate, and the solution was applied to a glass plate. In 3 hr at room temperature the coating film became tack-free, and curing of the coating film was completed in 2 days. This coating film was colorless and transparent and gained 10 marks in the cross-cut adhesion test.

EXAMPLE 7

Initially 8.6 g of vinyl propionate (VPr), 2.2 g of EGMAE, 15 ml of t-butyl alcohol, 85 ml of water, 0.02 g of methyl cellulose, 0.43 g of sodium borate and 0.11 g of IPP were charged in the 0.2-liter autoclave used in Example 5. After performing the same preliminary procedure as in the preceding examples, 12.5 g of CTFE was introduced into the cooled autoclave, so that the CTFE/VAc/EGMAE proportions became 50/40/10 by mol. The temperature in the autoclave was gradually raised, and radical copolymerization reaction was carried out at 40° C. for 24 hr. A copolymer formed by the reaction was recovered and treated in the same manner as in Example 1. The dry weight of the obtained copolymer was 11.7 g.

With respect to solution of this copolymer in THF at 30° C., the intrinsic viscosity was 0.40 dl/g. By infrared absorption spectrum analysis of this copolymer, absorption peaks were observed at 3530 cm$^{-1}$ (—OH), 2890–3020 cm$^{-1}$ (C—H) and 1750 cm$^{-1}$ (C=O). Thermal analysis of this copolymer by DSC and TG revealed that the copolymer does not have a melting point. By TG it was found that weight loss of the copolymer begins at 240° C. By elementary analysis this copolymer contained 4.19% of H, 40.74% of C and 14.8% of Cl.

A solution was prepared by dissolving 10 parts by weight of this CTFE/VAc/EGMAE copolymer in a mixture of toluene and methyl isobutyl ketone and adding 1 part by weight of isophorone diisocyante, and the solution was applied to a chromated and degreased aluminum plate. After curing at room temperature, the coating film exhibited a good gloss and high adhesion strength.

EXAMPLE 8

Initially 12.0 g of VAc, 2.2 g of EGMAE, 100 ml of F-113 and 0.3 g of BPO were charged in the 0.2-liter autoclave used in Example 5. After performing the same preliminary procedure as in the preceding examples, 6.3 g of CTFE was introduced into the cooled autoclave, so that the CTFE/VAc/EGMAE proportions became 25/65/10 by mol. The temperature in the autoclave was gradually raised, and radical copolymerization reaction was carried out at 65° C. for 24 hr. A powdery copolymer formed by the reaction was recovered by filtration and washed. After drying the copolymer weighed 8.2 g.

With respect to solution of this copolymer in THF at 30° C., the intrinsic visocity was 0.25 dl/g. By elementary analysis, this copolymer contained 5.38% of H, 47.15% of C and 7.64% of Cl.

A solution was prepared by dissolving 10 parts by weight of this CTFE/VAc/EGMAE copolymer in a mixture of toluene and methyl isobutyl ketone and adding 1 part by weight of xylylene diisocyanate, and the solution was applied to a glass sheet. After curing at room temperature the coating film was transparent and exhibited a good gloss.

EXAMPLE 9

Initially 7.7 g of VAc, 1.1 g of EGMAE, 0.7 g of hydroxyethyl acrylate (HEA), 100 ml of F-113 and 0.3 g of BPO were charged in the 0.2-liter autoclave used in Example 5. After performing the same preliminary procedure as in the preceding examples, 12.5 g of CTFE was introduced into the cooled autoclave, so that the CTFE/VAc/EGMAE/HEA proportions became 50/42/5/3 by mol. The temperature in the autoclave was gradually raised, and radical copolymerization reaction was carried out at 65° C. for 24 hr. A powdery copolymer formed by the reaction was recovered by filtration and washed. After drying the copolymer weighed 11.2 g.

With respect to solution of this copolymer in THF at 30° C., the intrinsic viscosity was 0.22 dl/g. By elementary analysis, this copolymer contained 3.82% of H, 39.21% of C and 14.28% of Cl.

This CTFE/VAc/EGMAE/HEA copolymer and melamine employed as the curing agent were dissolved in a mixture of toluene and methyl isobutyl ketone, and the solution was applied to an aluminum plate. It was possible to fully cure the coating film by heating at 160° C. for 30 min.

What is claimed is:

1. A curable copolymer comprising:
    25 to 75 mol % of first repeating units which originate from chlorotrifluoroethylene;
    10 to 70 mol % of second repeating units which originate from a fatty acid ester represented by the general formula (I),

wherein R represents hydrogen atom or methyl group and R' represents an alkyl group having 1 to 12 carbon atoms; and 3 to 40 mol % of third repeating units which originate from a hydroxyl-containing allyl ether represented by the general formula (II),

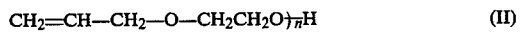

wherein n is an integer from 1 to 6.

2. A copolymer according to claim 1, further comprising not more than 20 mol % of optional repeating units which originate from at least one monomer selected from the group consisting of acrylates, methacrylates, acrylic amides and vinyl ethers.

3. A copolymer according to claim 2, wherein the amount of said optional repeating units is not more than 10 mol %.

4. A copolymer according to claim 1, wherein said first, second and third repeating units amount to 40–60 mol %, 20–50 mol % and 5–30 mol %, respectively.

5. A copolymer according to claim 1, wherein said fatty acid ester is a fatty acid vinyl ester selected from the group consisting of vinyl acetate, vinyl propionate, vinyl lactate, vinyl butyrate, vinyl isobutyrate, vinyl caproate, vinyl isocaproate, vinyl pivalate and vinyl caprylate.

6. A copolymer according to claim 1, wherein said fatty acid ester is a fatty acid isopropenyl ester selected from the group consisting of isopropenyl acetate and isopropenyl propionate.

7. A copolymer according to claim 1, wherein said hydroxyl-containing allyl ether is selected from the group consisting of ethylene glycol monoallyl ether, diethylene glycol monoallyl ether and triethylene glycol monoallyl ether.

8. A copolymer according to claim 1, wherein said fatty acid ester is vinyl acetate and said hydroxyl-containing allyl ether is ethylene glycol monoallyl ether.

9. A copolymer according to claim 1, wherein said fatty acid ester is vinyl propionate and said hydroxyl-containing allyl ether is ethylene glycol monoallyl ether.

10. A copolymer according to claim 1, wherein said fatty acid ester is isopropenyl acetate and said hydroxyl-containing allyl ether is ethylene glycol monoallyl ether.

11. A copolymer according to claim 1, wherein the proportions of said first, second and third repeating units are such that the intrinsic viscosity of solution of the copolymer in tetrahydrofuran at 30° C. is in the range from 0.01 to 2.0 dl/g.

12. A copolymer according to claim 11, wherein said intrinsic viscosity is in the range from 0.05 to 0.5 dl/g.

* * * * *